US012699474B2

(12) United States Patent
Kaneda et al.

(10) Patent No.: US 12,699,474 B2
(45) Date of Patent: Aug. 4, 2026

(54) ELECTRONIC ERASER

(71) Applicant: Wacom Co., Ltd., Saitama (JP)

(72) Inventors: Takenori Kaneda, Saitama (JP); Hock Meng Wan, Saitama (JP); Kohei Tanaka, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 18/982,997

(22) Filed: Dec. 16, 2024

(65) Prior Publication Data

US 2025/0208725 A1 Jun. 26, 2025

(30) Foreign Application Priority Data

Dec. 20, 2023 (JP) ................................ 2023-214380

(51) Int. Cl.

*G06F 3/041* (2006.01)
*G01L 1/14* (2006.01)
*G06F 3/0354* (2013.01)
*G06F 3/044* (2006.01)
*G06F 3/0488* (2022.01)

(52) U.S. Cl.

CPC .......... *G06F 3/04142* (2019.05); *G01L 1/144* (2013.01); *G06F 3/03545* (2013.01); *G06F 3/04162* (2019.05); *G06F 3/044* (2013.01); *G06F 3/0488* (2013.01)

(58) Field of Classification Search

None
See application file for complete search history.

(56) References Cited

U.S. PATENT DOCUMENTS

2021/0247851 A1* 8/2021 Kamiyama ............. G06F 3/046

FOREIGN PATENT DOCUMENTS

| | | |
|---|---|---|
| JP | H02155020 A | 6/1990 |
| JP | H0869350 A | 3/1996 |
| WO | WO 2020095710 A1 | 5/2020 |

* cited by examiner

*Primary Examiner* — Stephen T. Reed
(74) *Attorney, Agent, or Firm* — Seed Intellectual Property Law Group LLP

(57) ABSTRACT

Disclosed here is an electronic eraser includes an electronic pen unit that includes a core body and a pressure detector that, in operation, detects a pressure applied to the core body and that sends an erasing signal including pressure information detected by the pressure detector, a housing having a substantially rectangular parallelepiped shape, and a corner member that is integral with the housing, is separable from the housing, and has a square pyramid shape having a triangular side surface configuring a part of a bottom surface of the housing. The core body is inserted into a portion of a central axis coincident with a perpendicular line drawn from a vertex of the corner member to a bottom surface of the corner member, and the electronic pen unit is obliquely arranged in the housing, so that the corner member is slidable and movable in a direction of the central axis.

16 Claims, 6 Drawing Sheets

ELECTRONIC ERASER

BACKGROUND

Field of the Invention

The present disclosure relates to an electronic eraser capable of erasing handwriting information written on, for example, a tablet personal computer (PC) or the like by use of an electronic pen in a use mode similar to a pencil eraser for stationery.

Description of the Related Art

An electronic apparatus such as a tablet PC and a smartphone equipped with a thin display device such as a liquid crystal display (LCD) and a position detection device (device configured with a position detection sensor and a position detection circuit) has been widely used. Characters, figures, symbols, and the like can be input to such an electronic apparatus as handwriting information by a user by use of what is generally called an electronic pen. When the handwriting information is input, since a handwriting image corresponding to the handwriting information is displayed at a position on a display screen of a display device corresponding to the indicated position of the electronic pen, the user can input the handwriting information to the electronic apparatus in a manner similar to a case of recording on a sheet with a pencil.

In a case where the handwriting information input to the electronic apparatus by use of the electronic pen is to be corrected, the handwriting information is erased by use of an eraser (pencil eraser) function for sending a signal different from that when the handwriting information is input. The eraser function is provided at the rear end of the electronic pen as disclosed in Japanese Patent Laid-Open No. Hei8-069350 to be described later. That is, as with a pencil having a pencil eraser at the rear end, an electronic pen with the eraser function in which one end of the electronic pen serves as a writing function and the other end thereof serves as the eraser function is used. Then, while checking the handwriting image displayed on the display screen of the display device, the user brings the rear end of the electronic pen provided with the eraser function close to a portion to be erased and erases the handwriting information of the portion to be corrected.

However, even in a case where a pencil with a pencil eraser attached to the rear end is used, when handwriting written on a sheet is erased, the pencil eraser provided at the rear end of the pencil is rarely used, and an independent pencil eraser is used in many cases. One of the reasons may be that the independent pencil eraser is more familiar to the user and can neatly erase handwriting as expected by the user rather than using the pencil eraser provided at the rear end of the pencil. Therefore, even in a case where the handwriting information input to the electronic apparatus by the electronic pen is erased, an independent electronic eraser including only a function of erasing handwriting information is also realized as disclosed in Japanese Patent Laid-Open No. Hei2-155020 to be described later.

However, in a case of the independent electronic eraser including only a function of erasing handwriting information as disclosed in Japanese Patent Laid-Open No. Hei2-155020, the entire end surface on the side where a signal is emitted serves as an indicated position as also disclosed in Japanese Patent Laid-Open No. Hei2-155020. Therefore, in the case of the conventional independent electronic eraser, it is difficult to erase handwriting information in a very narrow range. Thus, the applicants of this application propose a chalk type or rectangular parallelepiped type electronic eraser that can easily erase handwriting information in a small range by bringing a corner part configured with a bottom surface and a side surface into contact with a position detection sensor, as disclosed in PCT Patent Publication No. WO2020/095710 to be described later.

In recent years, electronic apparatuses such as tablet PCs have been increasingly used by pupils and students in the field of education such as elementary schools and junior high schools. Therefore, it is desirable not only to be able to input handwriting information to an electronic apparatus with an electronic pen in such a manner leaving handwriting on a sheet with a pencil, but also to be able to erase handwriting information input to the electronic apparatus as intended by a user in such a manner erasing handwriting written on a sheet with a pencil eraser. Therefore, it is conceivable to use the chalk type or rectangular parallelepiped type electronic eraser disclosed in the above-described International Publication No. 2020/095710 that can be used in a manner similar to an existing pencil eraser for stationery.

However, in the case of the existing pencil eraser for stationery, the size of an erasing area can be changed according to the degree of force to apply, and an erasing mode such as slightly erasing or completely erasing can be changed. Therefore, even in the electronic eraser, it is desired to more appropriately detect the pressing force applied to the electronic eraser at the time of erasing, and to realize the erasing processing of handwriting information according to the detected pressing force. In addition, in a case where the handwriting information is erased by use of a corner part configured with a bottom surface and a side surface of the electronic eraser, since the area of the corner part in contact with the operation surface is small, there is a possibility that the corner part is worn out and the erasing processing cannot always be performed with the same feeling.

BRIEF SUMMARY

In view of the above, embodiments of the present disclosure can erase handwriting information or the like input to an electronic apparatus such as a tablet PC according to the intention of a user in a manner similar to the case of using a pencil eraser for stationery.

In order to solve the above problem, an embodiment of the present disclosure provides an electronic eraser including an electronic pen unit that includes a core body and a pressure detector that, in operation, detects a pressure applied to the core body and that sends an erasing signal including pressure information detected by the pressure detector, a housing having a substantially rectangular parallelepiped shape, and a corner member that is integral with the housing, is separable from the housing, and has a square pyramid shape having a triangular side surface configuring a part of a bottom surface of the housing, in which the core body of the electronic pen unit is inserted into a portion of a central axis coincident with a perpendicular line drawn from a vertex of the corner member to a bottom surface of the corner member, and the electronic pen unit is obliquely arranged in the housing, so that the corner member is slidable and movable in a direction of the central axis.

The electronic eraser includes the electronic pen unit, the housing, and the corner member. The housing has a substantially rectangular parallelepiped shape, and the corner member is a member integral with the housing, but is separable from the housing and has a square pyramid shape having a triangular side surface configuring a part of the bottom surface of the housing. The core body of the electronic pen unit is inserted into the central axis portion coincident with a perpendicular line drawn from the vertex of the corner member to the bottom surface of the corner member, and the electronic pen unit is obliquely arranged in the housing, and the corner member can slide and move in the central axis direction.

Accordingly, when the housing of the electronic eraser is gripped and the vertex of the corner member is brought into contact with and pushed against a portion on the operation surface of the electronic apparatus where the handwriting information is displayed, the core body of the electronic pen unit inserted into the central axis portion of the corner member is pushed in the axial direction of the electronic pen unit. Therefore, the erasing signal including the pressing information is sent from the electronic eraser to the electronic apparatus, and erasing of the handwriting information is realized. In this case, the handwriting information can be erased according to the intention of the user by use of the vertex of the corner member.

DETAILED DESCRIPTION

Hereinafter, an embodiment of an electronic eraser according to the present disclosure will be described with reference to the drawings. The electronic eraser of the present disclosure is used for an electronic apparatus such as a tablet personal computer or a smartphone on which a thin display device such as an LCD and a position detection device are mounted. That is, the electronic eraser of the present disclosure is used in the case of erasing handwriting information (handwriting image) such as characters, symbols, and figures input to the electronic apparatus by use of an electronic pen (position indicator for recording), and may be called an electronic pencil eraser.

Overview of Electromagnetic Resonance Technology System and Active Capacitance Type System First, schematic configurations of a position detection device and a position indicator (electronic pen) will be described. Systems of the position detection device and the position indicator (electronic pen) include, for example, an electromagnetic resonance technology (EMR) system and an active capacitance type (AES) system.

In the electromagnetic resonance technology system, a position detection device includes a sensor part in which a plurality of loop coils are arranged in each of the X-axis direction and the Y-axis direction. Then, a transmission period in which electric power is sequentially supplied to the plurality of loop coils of the sensor part to generate a magnetic field and a reception period in which the supply of electric power is stopped to receive a magnetic field from the outside are alternately provided. The corresponding position indicator includes a resonant circuit including a coil and a capacitor, generates a signal (magnetic field) in such a manner that a current flows through the coil according to the magnetic field from the sensor part, and transmits the signal including pen pressure information to a position detection sensor. The position detection device receives the signal in the reception period, and detects the indicated position and the pen pressure by the electronic pen.

In the case of the active capacitance type system, the electronic pen transmits a signal from an oscillation circuit mounted on the electronic pen while including the pen pressure information, and receives the signal by the position detection device to detect the indicated position and pen pressure. The electronic eraser of the present disclosure can be configured for a position detection device of the electromagnetic resonance technology system or a position detection device of the active capacitance type system. In order to simplify the following description of the embodiment, description will be made by taking an example of an electronic eraser configured to be used for a position detection device of the AES system.

Appearance of Electronic Eraser

Figure 1A:
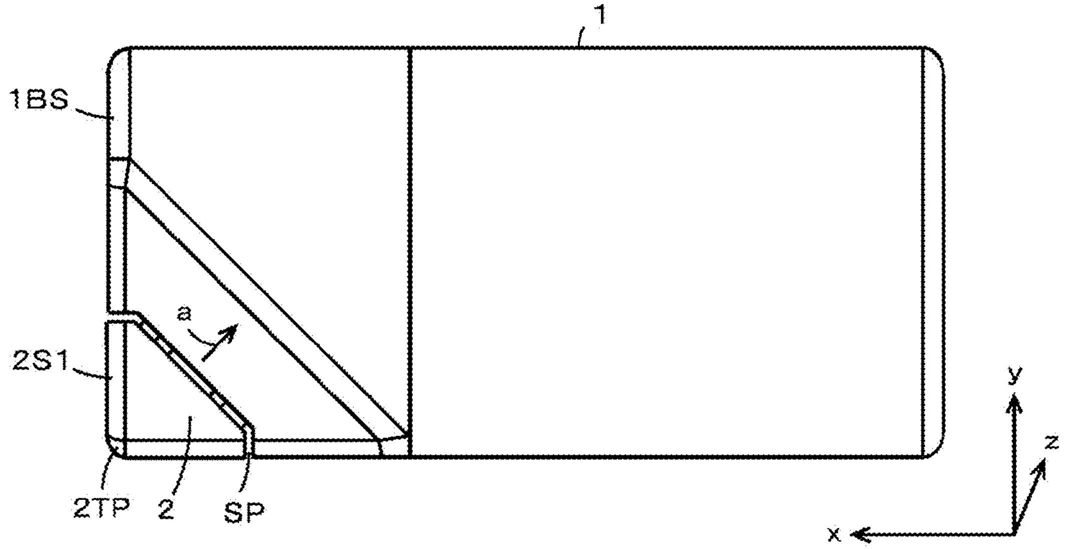
FIGS. 1A and 1B are diagrams each describing an appearance of an electronic eraser of an embodiment of the present disclosure.
Figure 1B:
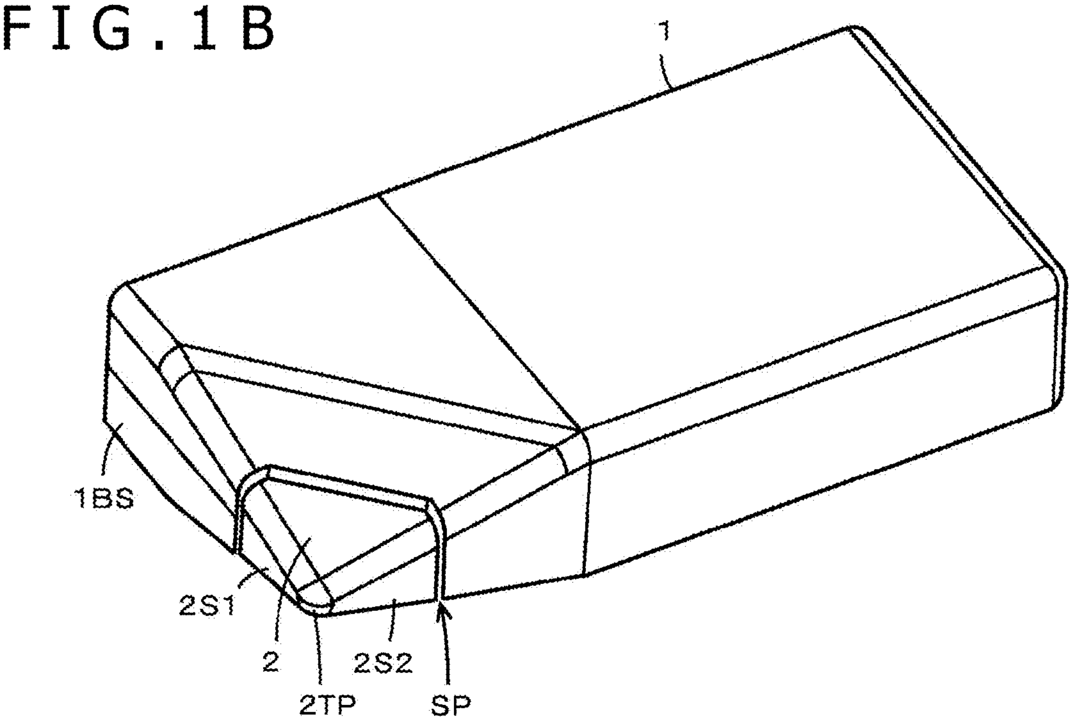

FIGS. 1A and 1B are diagrams each describing an appearance of an electronic eraser of an embodiment, FIG. 1A is a front view of the electronic eraser, and FIG. 1B is a perspective view of the electronic eraser. As depicted in FIG. 1A, the appearance of the electronic eraser of the embodiment includes a housing 1 and a corner member 2, and has a shape and a size similar to those of a pencil eraser for stationery. That is, as depicted in FIG. 1A, among the length in the longitudinal direction (x-axis direction), the length in the lateral direction (y-axis direction), and the length in the depth direction (z-axis direction) of the housing 1, the width in the depth direction is shorter than the length in the longitudinal direction and the length in the lateral direction.

As depicted in FIGS. 1A and 1B, the housing 1 has a substantially rectangular parallelepiped shape, but has a shape in which the corner of the lower right end is cut off in FIGS. 1A and 1B. The corner member 2 is provided at a position corresponding to the cut corner of the lower right end of the housing 1. As depicted in FIGS. 1A and 1B, the corner member 2 is a member integral with the housing 1, is separable from the housing 1, has a triangular side surface 2S1 configuring a part of a bottom surface 1BS of the housing 1, and has a square pyramid shape having a vertex 2TP.

Configuration of Corner Member 2

Figure 2A:
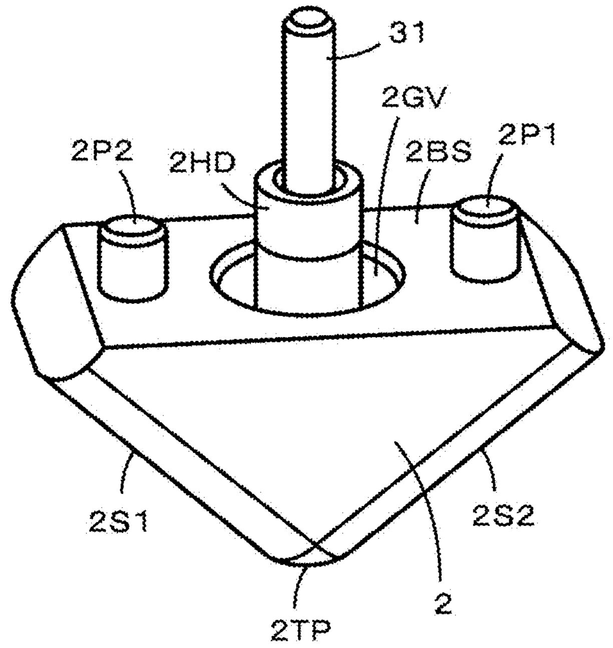
FIGS. 2A and 2B are diagrams each describing a corner member of the electronic eraser of the embodiment of the present disclosure-.
Figure 2B:
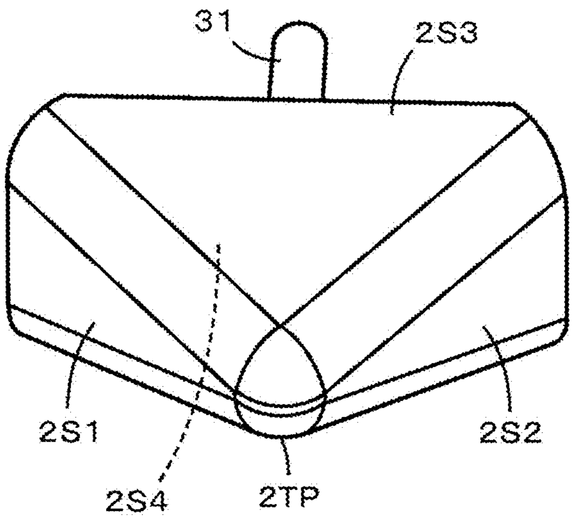

FIGS. 2A and 2B are diagrams each describing the corner member 2 of the electronic eraser of the embodiment, FIG. 2A depicts a diagram when viewed from the bottom surface 2BS side of the corner member 2, and FIG. 2B depicts a diagram when viewed from the vertex 2TP side of the corner member 2. As depicted in FIGS. 2A and 2B, the corner member 2 has a square pyramid shape having four triangular side surfaces 2S1, 2S2, 2S3, and 2S4 on a square bottom surface 2BS, and the bases of the side surfaces 2S3 and 2S4 are longer than those of the side surfaces 2S1 and 2S2. As depicted in FIG. 2A, a cylindrical core body holding part 2HD for holding a conductive core body 31 of an electronic pen unit 3 described later is provided at the center portion of the square bottom surface 2BS of the corner member 2. Around the core body holding part 2HD, a groove part 2GV into which the tip side of a peripheral electrode 32 of the electronic pen unit 3 described later is inserted is provided.

As depicted in FIG. 2A, the core body holding part 2HD has a perpendicular line drawn from the vertex 2TP to the bottom surface 2BS as the central axis, and the central axis coincides with the central axis of the core body 31 of the electronic pen unit 3 inserted into the core body holding part 2HD. In addition, as will be described later in detail, the bottom surface 2BS of the corner member 2 is provided with regulation parts 2P1 and 2P2 that are columnar projections for regulating (suppressing) the rotation of the corner member 2 with the core body holding part 2HD interposed therebetween. In addition, as depicted in FIG. 2B, the vertex 2TP of the corner member 2 is rounded, and the hypotenuse of each side surface is also rounded.

As will be described later in detail, the corner member 2 depicted in FIGS. 2A and 2B is attached to the core body 31 of the electronic pen unit 3 to configure the electronic eraser together with the housing 1. In this case, as depicted in FIGS. 1A and 1B, a void (gap) SP is provided between the corner member 2 and the housing 1, and the corner member 2 can slide in the axial direction of the core body 31 of the electronic pen unit 3.

Configuration Members and the Like of Electronic Eraser

Figures 3A, 3B, 3C, 3D, 3E:
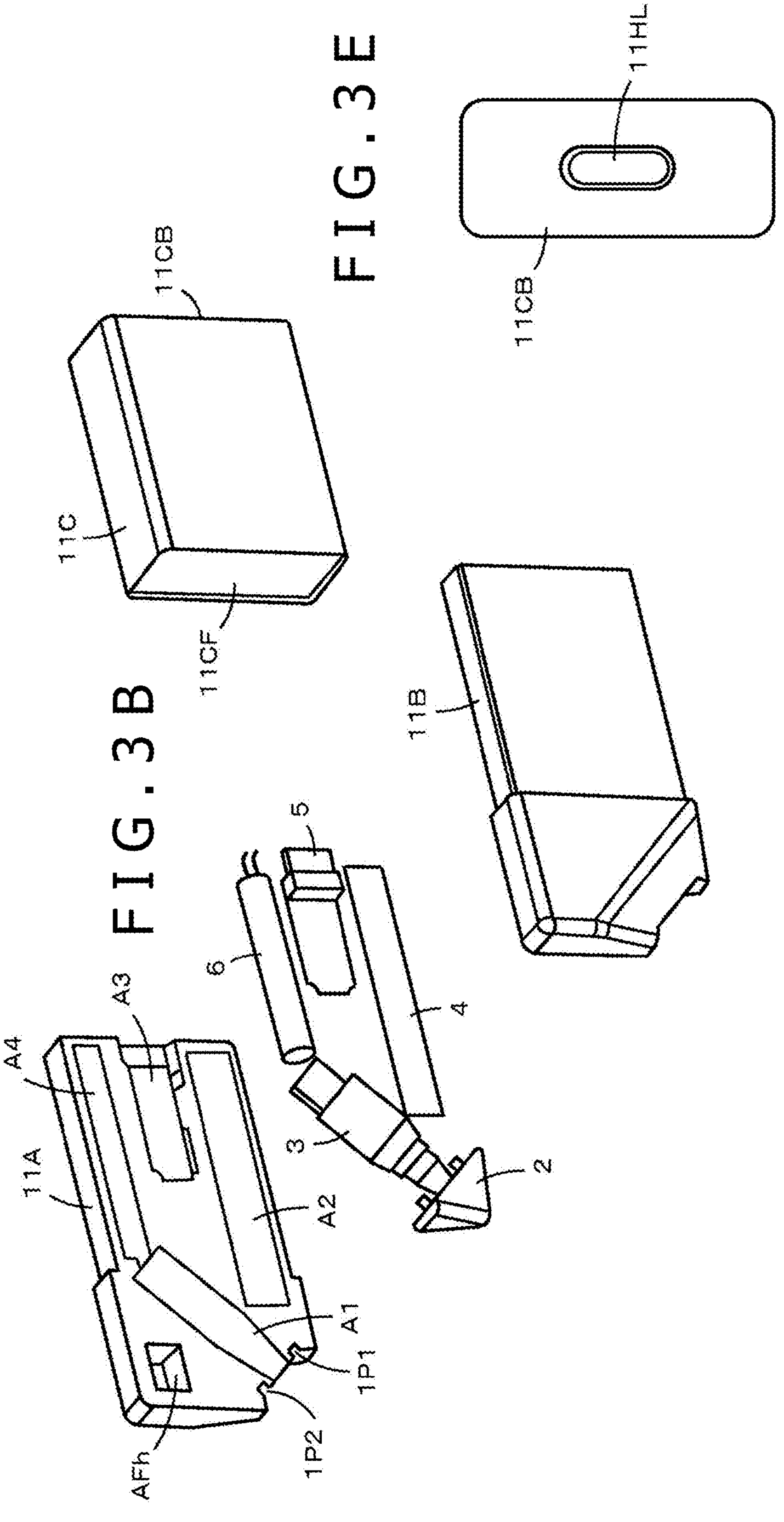
FIGS. 3A to 3E are exploded perspective views each describing the electronic eraser of the embodiment of the present disclosure.

FIGS. 3A to 3E are exploded perspective views each describing the electronic eraser of the embodiment. As depicted in FIGS. 3A to 3E, the housing 1 includes a first holder part 11A (FIG. 3A), a second holder part 11B (FIG. 3C), and a sleeve 11C (FIG. 11D). The first holder part 11A and the second holder part 11B configure one holder part having a substantially rectangular parallelepiped shape by making the inner surfaces thereof face each other and stick to each other. As depicted in FIG. 3B, the electronic pen unit 3, a circuit substrate 4, a universal serial bus (USB) circuit part 5, and a battery (secondary battery) 6 are mounted in the holder part including the first holder part 11A and the second holder part 11B.

Therefore, as depicted in FIG. 3A, recess parts into which each mounting component is fitted are provided on the inner surface of the first holder part 11A. A recess part A1 is a portion into which the electronic pen unit 3 is fitted. A recess part A2 is a portion into which the circuit substrate 4 is fitted. A recess part A3 is a portion into which the USB circuit part 5 is fitted. A recess part A4 is a portion into which the battery 6 is fitted. Although the inner surface of the second holder part 11B is not visible in FIG. 3C, recess parts B1, B2, B3, and B4 into which each mounting component is fitted are also provided on the inner surface of the second holder part 11B at positions corresponding to the recess parts A1, A2, A3, and A4 on the inner surface of the first holder part 11A.

Therefore, when the electronic pen unit 3, the circuit substrate 4, the USB circuit part 5, and the battery 6 are sandwiched between the first holder part 11A and the second holder part 11B and both of them are made close to each other, the portions of the inner surfaces of both of them where no mounting components are provided are brought into contact with each other. Accordingly, the mounting components can be mounted in the holder part including the first holder part 11A and the second holder part 11B without jolting. A part of the pen tip side of the electronic pen unit 3 mounted on the housing 1 projects from the lower right corner of the holder part, and the corner member 2 is attached as depicted in FIG. 3B.

It should be noted that the electronic eraser of the embodiment erases handwriting information input by performing a writing operation on an operation surface on a display screen by use of the electronic pen and displayed on the display screen in an electronic apparatus such as a tablet PC on which a position detection device is mounted. Therefore, the electronic pen unit 3 realizes a function of sending an erasing signal that is a position indicating signal for indicating an erasing range. In an electronic apparatus such as a tablet PC, a position detection device specifies an indicated position by the erasing signal and functions to erase the handwriting information at the specified position.

In addition, as will be described later in detail, the circuit substrate 4 is configured in such a manner that electronic components such as a detection circuit for detecting a pressure applied to the core body 31, a transmission circuit for forming an erasing signal and the like, a control integrated circuit (IC), a power supply circuit, a demodulation circuit, and a switch circuit are mounted. The electronic pen unit 3 and the circuit substrate 4 can realize the function equivalent to the electronic pen. In addition, the USB circuit part 5 includes a terminal part of the USB standard, and realizes a function of charging driving electric power to the battery 6 by receiving power supply from the outside. In addition, a power supply circuit is configured with the battery 6 and predetermined circuit components of the circuit substrate, and driving electric power is supplied to each part of the electronic eraser of the embodiment.

In the case of the electronic eraser of the embodiment, as described using FIGS. 2A and 2B, the core body 31 of the electronic pen unit 3 is inserted into and held by the core body holding part 2HD of the corner member 2. The inner diameter of the cylindrical core body holding part 2HD of the corner member 2 is slightly shorter than the outer diameter of the core body 31, so that, in a case where the core body 31 is inserted into and attached to the core body holding part 2HD, the core body 31 is not easily removed. However, if the core body is pulled out from the core body holding part 2HD of the corner member 2, the corner member 2 can be removed from the core body 31. Thus, the corner member 2 is detachably attached to the core body 31 of the electronic pen unit 3. As described using FIG. 2A, since the groove part 2GV is provided around the core body holding part 2HD of the bottom surface 2BS of the corner member 2, the peripheral electrode 32 of the electronic pen unit 3 does not become an obstacle in a case where the corner member 2 is attached to the core body 31 of the electronic pen unit 3.

In addition, as depicted in FIG. 3A, a fitting hole AFh is provided at the upper left end portion of the inner surface of the first holder part 11A. In addition, although not illustrated, a fitting projection is provided at a portion of the inner surface of the second holder part 11B facing the fitting hole AFh of the first holder part 11A. The outer edge of the fitting projection has the same shape as the inner edge of the fitting hole AFh, but is slightly smaller, and the height of the fitting projection is slightly lower than the depth of the fitting hole AFh. Therefore, as depicted in FIGS. 3A to 3E, when the inner surfaces of the first holder part 11A and the second holder part 11B are arranged to face each other, the fitting projection of the second holder part 11B is fitted into the fitting hole AFh of the first holder part 11A. Accordingly, the first holder part 11A and the second holder part 11B are not easily separated from each other.

In addition, it is assumed that the inner surfaces of the first holder part 11A depicted in FIG. 3A and the second holder part 11B depicted in FIG. 3B are arranged to face each other. In this case, the portion on which the circuit substrate 4, the USB circuit part 5, and the battery 6 are mounted is one size smaller than the portion on which the electronic pen unit 3 is mounted. This is because the sleeve 11C covers the portion on which the circuit substrate 4, the USB circuit part 5, and the battery 6 are mounted. As depicted in FIG. 3D, the sleeve 11C has a rectangular parallelepiped shape in appearance, and has an opening 11CF on the tip end surface, a rear end surface 11CB is closed, and the inside thereof is a hollow box-like body (housing).

Therefore, as depicted in FIGS. 3A to 3E, the electronic pen unit 3, the circuit substrate 4, the USB circuit part 5, and the battery 6 are sandwiched between the first holder part 11A and the second holder part 11B. Thereafter, when the sleeve 11C covers the rear end side of the first holder part 11A and the second holder part 11B and the corner member 2 is attached to the pen tip of the electronic pen unit 3, the electronic eraser having the appearance depicted in FIG. 1 is obtained. It should be noted that the USB circuit part 5 charges the battery 6 as described above. Therefore, as depicted in FIG. 3E, an opening 11HL for connecting a connector part of a USB cable connected to the power supply to the terminal part of the USB circuit part 5 is provided on the rear end surface 11CB of the sleeve 11C.

Internal Configuration of Electronic Eraser with Each Component Mounted

Figure 4:
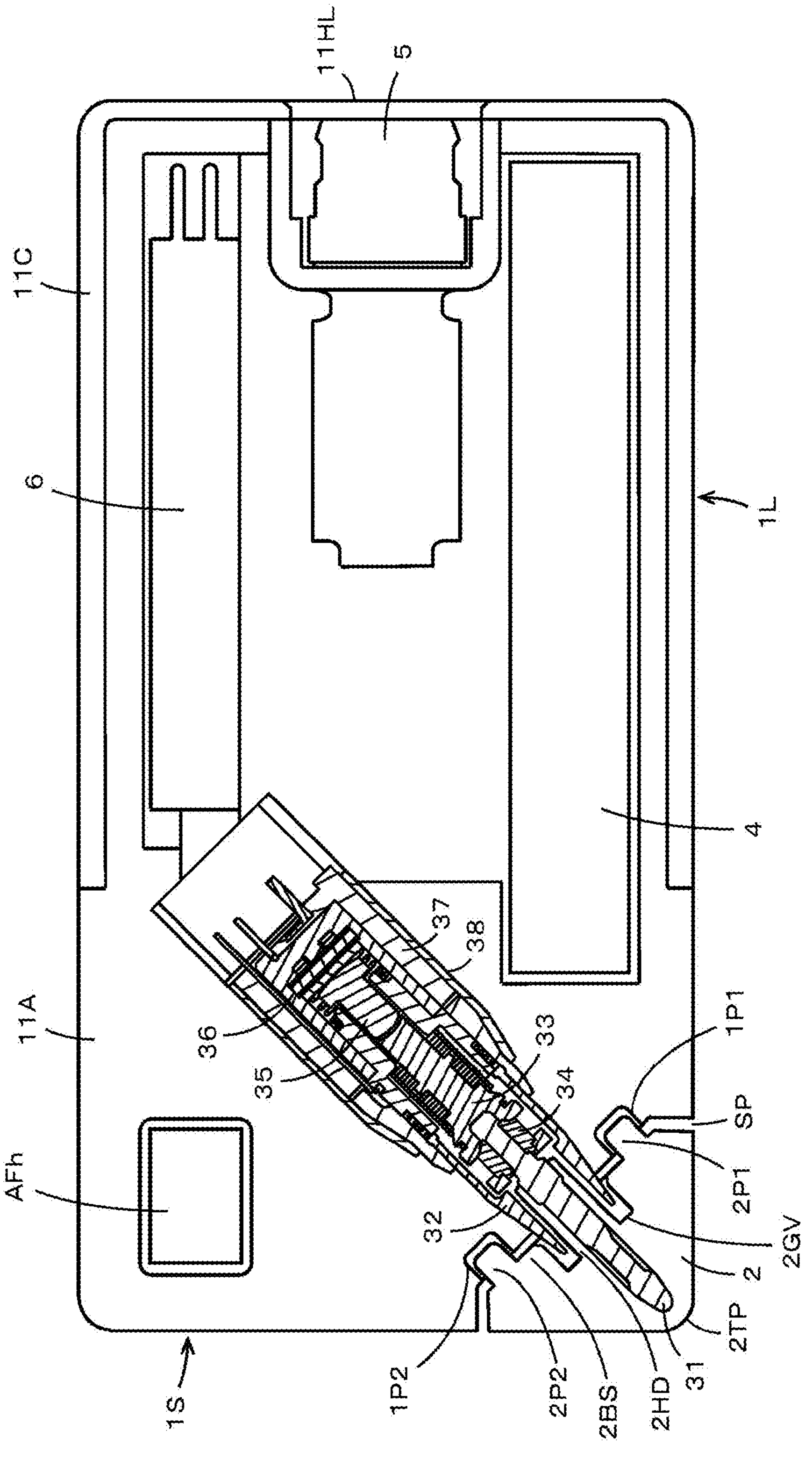
FIG. 4 is a diagram for describing an internal configuration of the electronic eraser of the embodiment of the present disclosure.

FIG. 4 is a diagram for describing an internal configuration of the electronic eraser of the embodiment. Specifically, FIG. 4 is a diagram obtained in such a manner that the sleeve 11C is cut in the longitudinal direction so as to be divided into two equal parts on the front side and the rear side in FIG. 4, the front side portion is removed, and the second holder part 11B located on the front side is removed such that the inside thereof is visible. In addition, FIG. 4 depicts cross sections of the electronic pen unit 3 and the corner member 2 in a case where they are cut in the longitudinal direction so as to be divided into two equal parts on the front side and the rear side in FIG. 4 and the front side portion is removed. It should be noted that, although the cross section of the corner member 2 is also depicted, the diagonal lines indicating the cross section are omitted in the corner member 2 in order to clearly distinguish it from the electronic pen unit 3. In addition, in FIG. 4, the same parts as those depicted in FIG. 1A to FIG. 3E are denoted by the same reference signs, and detailed descriptions of these parts are omitted.

As depicted in FIG. 4, the electronic pen unit 3 is provided in such a manner that the central axis of the electronic pen unit 3 is inclined so as to divide an angle (angle of 90 degrees) formed by a side 1L of the housing 1 in the longitudinal direction and a side 1S of the housing 1 in the lateral direction into two equal parts. That is, in the embodiment, the angle formed between the central axis of the electronic pen unit 3 and the side 1L of the housing 1 in the longitudinal direction is 45 degrees, and the angle formed between the central axis of the electronic pen unit 3 and the side 1S of the housing 1 in the lateral direction is 45 degrees. However, this is an example, and the angle can be slightly adjusted at the time of manufacturing.

In the electronic pen unit 3, a holding member 37 is provided inside a cylindrical electronic pen housing 38, and the core body 31, a coupling member 33, a pressing member

35, and a pressure detector 36 are arranged and mounted inside the holding member 37 in the central axial direction (axial direction). The core body 31 is attached so as to be inserted into an clastic member 34 fixed to a mounting part of the coupling member 33. The cylindrical peripheral electrode 32 is provided around the rear end side of the core body 31. The electronic pen unit 3 of the embodiment is of what is generally called the AES system, and sends an erasing signal (a position indicating signal for indicating an erasing position) from the core body 31. In addition, the electronic pen unit 3 sends a signal for tilt detection from the peripheral electrode 32 and receives a signal from the position detection device through the peripheral electrode 32.

The pressure detector 36 is configured as a variable capacitance capacitor by a plurality of members. Therefore, in FIG. 4, the lead line denoted by the reference numeral 36 is drawn from the center portion of the pressure detector. Specifically, the pressure detector 36 includes a circular dielectric. A first electrode is provided on the rear end surface (the surface opposite to the core body 31) of the dielectric. A ring-like spacer is provided on the front end surface side (the surface side on the core body 31 side) of the dielectric, and a second electrode formed of conductive rubber or the like is provided so as to face the front end surface of the dielectric with the ring-like spacer interposed therebetween. The second electrode is pressed by the coupling member 33 and the pressing member 35 that are pushed in or pushed out along with the sliding movement of the core body 31. Accordingly, when the second electrode approaches or is separated from the dielectric, the capacitance (the amount of charged charge) between the first electrode and the second electrode changes, and the pressure applied to the core body 31 can be detected according to the change in the capacitance.

In the mode depicted in FIG. 4, the core body 31 of the electronic pen unit 3 mounted in the housing 1 is inserted into the core body holding part 2HD of the corner member 2 from the pen tip side. Accordingly, the corner member 2 can be attached to the housing 1. In this case, the tip end portion of the cylindrical peripheral electrode 32 provided around the core body 31 enters the groove part 2GV provided around the core body holding part 2HD of the corner member 2. Accordingly, the peripheral electrode 32 does not obstruct the attachment of the corner member 2 and does not prevent the movement of the corner member 2 in the axial direction of the electronic pen unit 3.

Accordingly, as depicted in FIG. 4, the tip of the core body 31 can be positioned at a position corresponding to the vertex 2TP of the corner member 2 and at a position slightly away from the vertex 2TP, so that the erasing signal can be sent from the vertex 2TP portion of the corner member 2. In addition, as depicted in FIG. 4, the peripheral electrode 32 of the electronic pen unit 3 is exposed from the void SP between the corner member 2 and the housing 1, and signals can excellently be transmitted and received between the peripheral electrode 32 and the position detection device, as will be described later.

Further, as described above and depicted in FIG. 4, the bottom surface 2BS of the corner member 2 is provided with the regulation parts 2P1 and 2P2 that are columnar projections. In addition, as depicted in FIG. 4, on the surface of the housing 1 facing the bottom surface 2BS of the corner member 2, recess parts 1P1 and 1P2 are provided at portions corresponding to the regulation parts 2P1 and 2P2 of the bottom surface 2BS of the corner member 2. Accordingly, the regulation parts 2P1 and 2P2 on the bottom surface 2BS of the corner member 2 are fitted into the recess parts 1P1 and 1P2 on the housing 1 side, and regulate (suppress) the rotation of the corner member 2 around the core body 31. In a case where the corner member 2 rotates, the erasing operation becomes difficult, but since the rotation is suppressed, it does not become difficult to use.

Equivalent Circuit of Electronic Eraser

Figure 5:
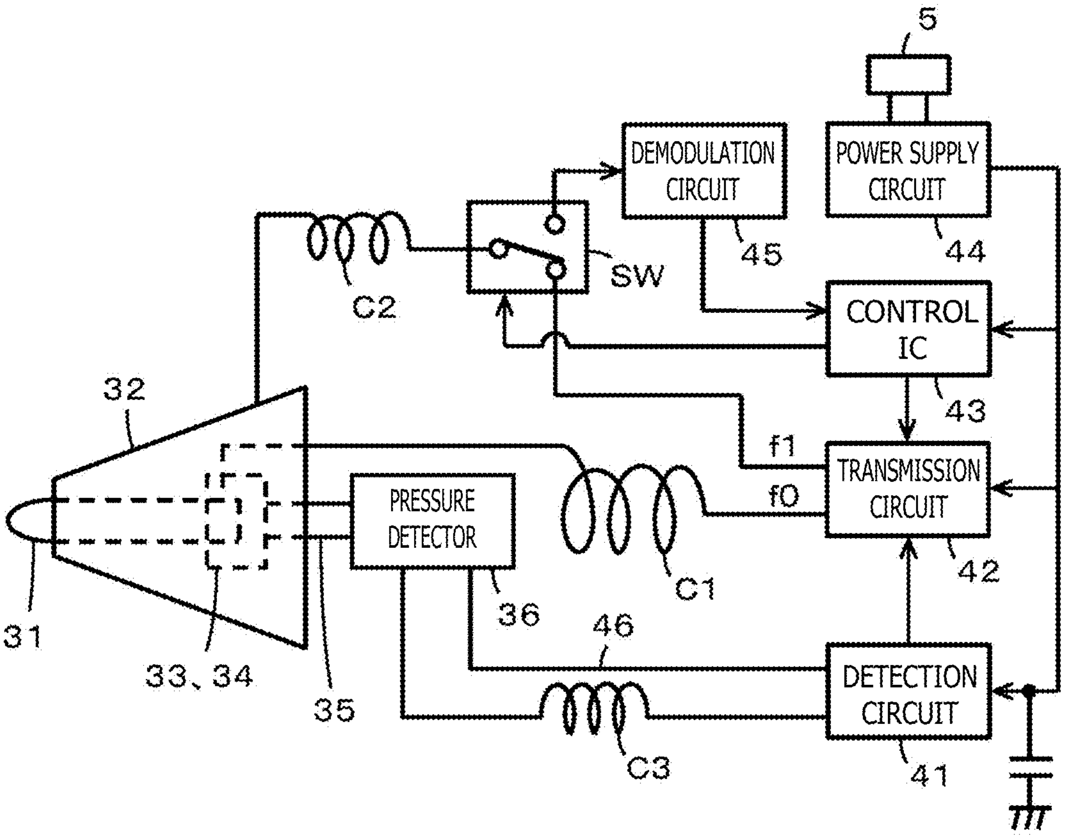
FIG. 5 is a diagram for depicting an equivalent circuit of an electronic eraser (electronic eraser of an active capacitance type system) of the embodiment of the present disclosure.

FIG. 5 is a diagram for depicting an equivalent circuit of the electronic eraser (active capacitance type system) of the embodiment. As depicted in FIG. 5, the conductive core body 31 is connected to a transmission circuit 42 through a coil spring C1 for the core body, and can send an erasing signal having a frequency of, for example, f0. In addition, the peripheral electrode 32 is connected to a switch circuit SW through a coil spring C2, and is connected to the transmission circuit 42 and a demodulation circuit 45 through the switch circuit SW. The switch circuit SW is switched by a control IC 43.

The switch circuit SW is normally switched to the demodulation circuit side, and a signal from the position detection device received through the peripheral electrode 32 is supplied to the demodulation circuit 45. Accordingly, a transmission request of a tilt detection signal is received from the position detection circuit side through the peripheral electrode 32, the request is demodulated by the demodulation circuit 45, and the demodulation result can be notified to the control IC 43. In this case, the control IC 43 switches the switch circuit SW to the transmission circuit 42 side, controls the transmission circuit 42, forms the tilt detection signal having a frequency of, for example, f1, and supplies it to the peripheral electrode 32. Accordingly, the tilt detection signal having a frequency of f1 can be sent to the position detection device through the peripheral electrode 32. After sending the tilt detection signal for a certain period of time, the control IC 43 switches the switch circuit SW to the demodulation circuit 45 side and waits for the arrival of a signal from the position detection device. As described above, the peripheral electrode 32 enables transmission of the tilt detection signal and reception of the transmission request of the tilt signal from the position detection circuit side.

In addition, when the switch circuit SW is switched to the demodulation circuit 45 side, the control IC 43 controls the transmission circuit 42 to form an erasing signal having a frequency of, for example, f0, and supplies the erasing signal to the core body 31. Accordingly, the erasing signal is transmitted from the core body 31 to the position detection device. In the embodiment, the erasing signal sent from the core body 31 includes information indicating the pressure applied to the core body 31. That is, the second electrode of the pressure detector 36 is pressed by the coupling member 33 and the pressing member 35 according to the pressure applied to the core body 31, and approaches the dielectric of the pressure detector 36. In this case, the first electrode of the pressure detector 36 is connected to a detection circuit 41 of capacitance through a coil spring C3 for the pressure detector, and the second electrode of the pressure detector 36 is connected to the detection circuit 41 of capacitance through an extension line 46 of the second electrode. Accordingly, in the detection circuit 41, the pressure applied to the core body 31 can be detected according to a change in the capacitance.

The pressure applied to the core body 31 detected by the detection circuit 41 is supplied to the transmission circuit 42, included in the erasing signal, and transmitted from the core body 31 to the position detection device. In addition, the control of the transmission circuit 42 is performed by the control IC 43, and the supply of the driving electric power to each circuit part is performed by the power supply circuit 44. The power supply circuit 44 includes the battery 6, and the battery 6 receives electric power supply from the outside through the USB circuit part 5 and can store (charge) the driving electric power supplied to each part. It should be noted that, in the electronic pen unit 3 of the embodiment, each of the coil spring C1 for the core body, the coil spring C2, and the coil spring C3 for the pressure detector does not function as an inductor element.

That is, the coil spring C1 for the core body realizes a function of holding the coupling member 33 in the holding member 37 in a state where it can be moved with a high degree of freedom without being energized, and a function of supplying the erasing signal from the transmission circuit 42 to the core body 31. In addition, the coil spring C2 realizes a function of smoothly supplying the tilt detection signal from the transmission circuit 42 to the peripheral electrode 32 without affecting the periphery. In addition, the coil spring C2 realizes a function of smoothly supplying a signal received through the peripheral electrode 32 to the demodulation circuit 45 without affecting the periphery. The coil spring C3 for the pressure detector realizes a function of energizing the second electrode of the pressure detector 36 to the dielectric side with an appropriate force so as to be positioned at an appropriate position, and connecting the second electrode to the detection circuit 41 of capacitance.

As described above, the electronic eraser of the embodiment can transmit the erasing signal having a frequency of f0 to the position detection device through the core body 31 of the electronic pen unit 3 with the corner member 2 attached. In addition, the electronic eraser can receive an instruction to transmit the tilt detection signal from the position detection device through the peripheral electrode 32 of the electronic pen unit 3, and transmit the tilt detection signal having a frequency of f1 to the position detection device.

Effect of Embodiment

For the electronic eraser of the embodiment described with reference to FIG. 1A to FIG. 5, the user grips the housing 1 with his or her fingers and performs an operation of moving the erasing range by bringing the vertex 2TP of the corner member 2 into contact with the operation surface on the display screen on which the handwriting information by the electronic pen of the electronic apparatus with the position detection device mounted is displayed. In this case, since the vertex 2TP of the corner member is rounded, the vertex 2TP can be smoothly moved as it is in any direction.

In addition, since the contact range between the vertex 2TP of the corner member 2 and the operation surface is narrow and the pressure applied to the core body 31 is also included in the erasing signal, the handwriting information can be erased within the range intended by the user. That is, the erasing range can be widened or narrowed according to the pressure applied to the core body 31 through the corner member 2. In addition, the state of the tilt of the electronic eraser can also be grasped by the tilt detection signal from the peripheral electrode 32 on the position detection device side. Therefore, the erasing range can be adjusted according to the state of the tilt of the electronic eraser. For example, the erasing range can be widened in the direction in which the electronic eraser is tilted.

Through these facts, as with the case where handwriting on a paper medium is erased with use of a pencil eraser for stationery, the handwriting information input to the electronic apparatus such as a tablet PC by use of the electronic pen and displayed on the display screen can be erased with use of the electronic eraser of the embodiment.

Electronic Eraser of Electromagnetic Resonance Technology System

Figure 6:
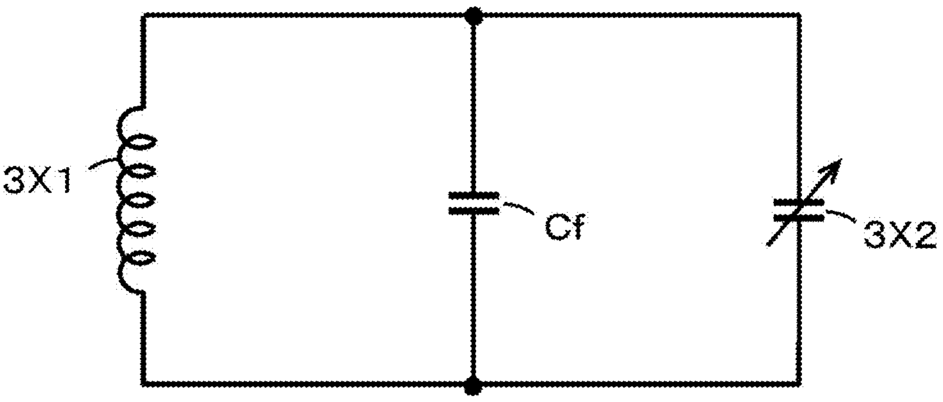
FIG. 6 is a diagram for depicting an equivalent circuit of an electronic eraser of an electromagnetic resonance technology system.

It should be noted that, although the electronic eraser of the above-described embodiment has been described as an active capacitance type system, the present disclosure is not limited thereto. An electronic eraser of an EMR system can also be configured. FIG. 6 is a diagram for depicting an equivalent circuit of an electronic eraser of the electromagnetic resonance technology system. Although not illustrated, in the case of the electronic eraser of the electromagnetic resonance technology system, a cylindrical ferrite core is provided in the electronic pen unit so as to cover the side surface of a rod-like core body, and a coil 3X1 is provided by winding a coated conductor around the side surface thereof. The coil 3X1 is connected to a capacitor Cf on a circuit substrate to configure a resonance circuit.

Further, as with the case of the pressure detector 36 described above, a pressure detector 3X2 having a configuration of a variable capacitance capacitor is provided, and is configured to be pressed by the core body such that a detection output of capacitance can be supplied to the resonance circuit. Accordingly, the electronic eraser of the electromagnetic resonance technology system can be realized. It should be noted that, since the electromagnetic resonance technology system is employed, it is not necessary to provide a battery or a USB circuit part, and the electronic eraser of the electromagnetic resonance technology system cooperating with the position detection device of the electromagnetic resonance technology system can be realized.

Electronic Eraser of Active Capacitance Type System Using Primary Battery

Figure 7:
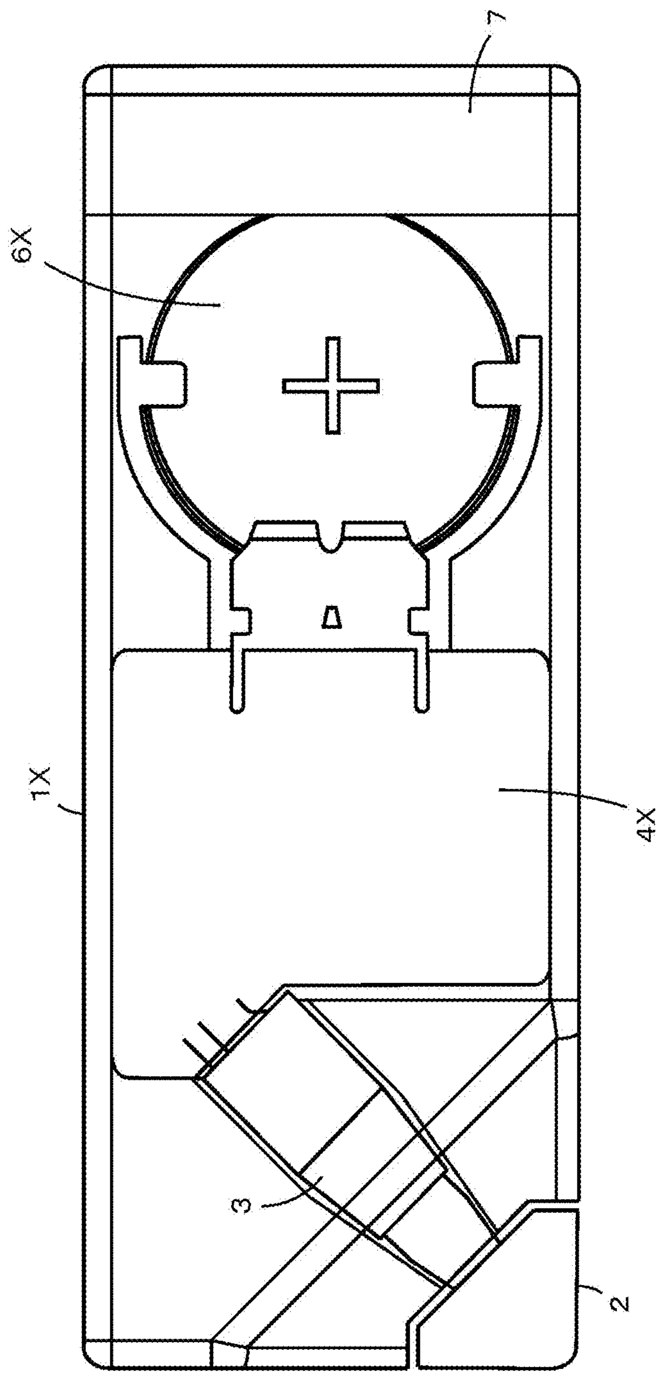
FIG. 7 is a diagram for describing another example of the electronic eraser of the embodiment of the present disclosure.

FIG. 7 is a diagram for describing another example of the electronic eraser of the embodiment, and is a diagram in which a housing 1X is transparent such that the inside thereof is visible. The electronic eraser of the above-described embodiment uses the battery 6 (secondary battery). However, for example, an electronic eraser of an active capacitance type system using a primary battery such as a button battery can also be configured. It should be noted that, in FIG. 7, the parts similarly configured to those of the electronic eraser of the embodiment described with reference to FIG. 1A to FIG. 5 are denoted by the same reference numerals.

As depicted in FIG. 7, in the electronic eraser of another example, the electronic pen unit 3 is mounted in the housing 1X in the similar manner to the electronic eraser of the embodiment described with reference to FIG. 1A to FIG. 5, and the corner member 2 is mounted on the core body 31 of the electronic pen unit 3. As with the circuit substrate 4 of the electronic eraser of the embodiment described with reference to FIG. 1A to FIG. 5, a circuit substrate 4X is configured in such a manner that electronic components such as a detection circuit for detecting a pressure applied to the core body, a transmission circuit for forming an erasing signal and the like, a control IC, a power supply circuit, a demodulation circuit, and a switch circuit are mounted.

However, the power supply circuit mounted on the circuit substrate of the electronic eraser of another example receives the supply of a power supply voltage from a button battery 6X to form driving electric power supplied to each part. Therefore, it is not necessary to provide the USB circuit part 5 for charging. In addition, a removable rear end cap 7 is provided at the rear end portion of the housing 1X to enable replacement of the button battery. When the rear end cap 7 is removed from the housing 1X, a part of the button battery 6X attached to the inside of the housing 1X is exposed, the button battery 6X can be pulled out, and a new button battery can be attached. After the replacement of the button battery, if the rear end cap 7 is attached to the rear end portion of the housing 1X, the inside of the housing 1X is sealed, so that the button battery can be prevented from being accidentally detached and dust or the like can be prevented from entering.

In the case of the electronic eraser of another example depicted in FIG. 7, since the charging process does not need to be performed, no time and effort is required for use. In addition, by preparing a spare button battery, even if the battery runs out, the electronic eraser can be used immediately by replacing the button battery, so that the electronic eraser itself does not become unusable.

Modified Example and the Like

It should be noted that the corner member 2 can be formed of, for example, various materials, but the side surface thereof is coated with resin so as not to deform such as being easily worn down even when it is rubbed against the operation surface. However, since the corner member 2 is removable, it can be easily replaced in a case where the feeling of use deteriorates such that the whole electronic eraser becomes difficult to use due to being slightly worn down or the like.

In addition, although the sleeve 11C of the above-described embodiment can be formed of a non-conductive member such as resin, if the sleeve 11C is formed of a conductive member such as aluminum or alumite, for example, the grounding path of the circuit substrate can be easily formed.

In addition, the size of the electronic eraser can be an appropriate size that can be easily gripped with fingers of a user. Therefore, the size of the electronic eraser can be made slightly larger such as 55 mm×27 mm×12 mm for users in lower grades of elementary schools, and can be made slightly smaller such as 43 mm×17 mm×10 mm for users in middle grades or higher of elementary schools. It is obvious that the sizes depicted herein are examples, and various other sizes are possible.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic eraser comprising:

an electronic pen unit that includes:

a core body; and a pressure detector that, in operation, detects a pressure applied to the core body and sends an erasing signal including pressure information detected by the pressure detector;

a housing having a substantially rectangular parallelepiped shape; and a corner member that is integral with the housing, is separable from the housing, and has a square pyramid shape having a triangular side surface configuring a part of a bottom surface of the housing, wherein the core body of the electronic pen unit is inserted into a portion of a central axis coincident with a perpendicular line drawn from a vertex of the corner member to a bottom surface of the corner member, and the electronic pen unit is obliquely arranged in the housing, so that the corner member is slidable and movable in a direction of the central axis.

2. The electronic eraser according to claim 1, wherein regulation parts regulating rotation of the corner member are provided on the bottom surface of the corner member and a surface of the housing facing the bottom surface of the corner member.

3. The electronic eraser according to claim 1, wherein, among a length in a longitudinal direction, a length in a lateral direction, and a length in a depth direction of the housing, the length in the depth direction is shorter than the length in the longitudinal direction and the length in the lateral direction.

4. The electronic eraser according to claim 1, wherein the core body is electrically conductive, and the electronic pen unit is of an active capacitance type system including a transmission circuit that, in operation, generates the erasing signal and supplies the erasing signal to the core body, and a power supply circuit that, in operation, supplies driving electric power to the transmission circuit.

5. The electronic eraser according to claim 4, wherein the power supply circuit includes a secondary power supply element that, in operation, is charged by receiving power supply from outside of the electronic eraser.

6. The electronic eraser according to claim 4, wherein the power supply circuit includes a button battery.

7. The electronic eraser according to claim 4, wherein a void is provided between the bottom surface of the corner member and a surface of the housing facing the bottom surface of the corner member, and wherein a peripheral electrode that, in operation, receives a predetermined signal is arranged around the core body, and part of the peripheral electrode is exposed from the void.

8. The electronic eraser according to claim 1, wherein an outer edge of the housing having a substantially rectangular parallelepiped shape is configured with a side in a longitudinal direction, a side in a lateral direction, and a side in a depth direction, and wherein the electronic pen unit is provided in the housing so that the core body divides an angle formed by the side in the longitudinal direction and the side in the lateral direction into two equal parts.

9. The electronic eraser according to claim 1, wherein the side surface of the corner member is coated with resin.

10. The electronic eraser according to claim 1, wherein the corner member is replaceable.

11. The electronic eraser according to claim 1, wherein the housing is covered with a sleeve.

12. The electronic eraser according to claim 4, wherein the housing is covered with a sleeve having conductivity.

13. The electronic eraser according to claim 1, wherein a tip portion of the corner member is configured to be rounded.

14. The electronic eraser according to claim 1, wherein the square pyramid shape of the corner member has four triangular side surfaces on the bottom surface of the corner member.

15. The electronic eraser according to claim 14, wherein the four triangular side surfaces include a first triangular side surface, a second triangular side surface, a third triangular side surface, and a fourth triangular side surface, and wherein a base of each of the third triangular side surface and the fourth triangular side surface is longer that a base of each of the first triangular side surface and the second triangular side surface.

16. The electronic eraser according to claim 1, wherein the corner member includes a first regulation part and a second regulation part that extend outwardly from the bottom surface of the corner member, wherein the housing includes a first recess part and a second recess part formed in a surface of the housing, and wherein, while the corner member is attached to the housing that a first regulation part is fitted into the first recess part and the second regulation part is fitted into the second recess part.

* * * * *